United States Patent
Schilp

(10) Patent No.: US 9,410,484 B2
(45) Date of Patent: Aug. 9, 2016

(54) COOLING CHAMBER FOR UPSTREAM WELD OF DAMPING RESONATOR ON TURBINE COMPONENT

(71) Applicant: Reinhard Schilp, Orlando, FL (US)

(72) Inventor: Reinhard Schilp, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 363 days.

(21) Appl. No.: 13/945,983

(22) Filed: Jul. 19, 2013

(65) Prior Publication Data

US 2015/0020498 A1    Jan. 22, 2015

(51) Int. Cl.
*F23R 3/00* (2006.01)
*F02C 7/12* (2006.01)
*F01D 9/02* (2006.01)

(52) U.S. Cl.
CPC . *F02C 7/12* (2013.01); *F01D 9/023* (2013.01); *F23R 3/002* (2013.01); *F05D 2260/963* (2013.01); *F23R 2900/00014* (2013.01)

(58) Field of Classification Search
CPC ........... F23R 2900/00014; F23R 3/002; F05D 2260/963
USPC .......................................................... 60/725
See application file for complete search history.

(56) References Cited

U.S. PATENT DOCUMENTS

| | | | |
|---|---|---|---|
| 3,793,827 A | 2/1974 | Ekstedt | |
| 4,944,362 A | 7/1990 | Motsinger et al. | |
| 6,351,947 B1 | 3/2002 | Keller et al. | |
| 6,530,221 B1 * | 3/2003 | Sattinger | F01D 25/30 118/213 |
| 6,640,544 B2 * | 11/2003 | Suenaga | F23M 20/005 181/213 |
| 6,837,051 B2 * | 1/2005 | Mandai | F23R 3/005 60/725 |
| 6,907,736 B2 * | 6/2005 | Ohnishi | F23R 3/002 60/725 |
| 6,973,790 B2 * | 12/2005 | Suenaga | F23M 20/005 181/213 |
| 7,080,514 B2 | 7/2006 | Bland et al. | |
| 7,089,741 B2 * | 8/2006 | Ikeda | F23R 3/002 60/725 |
| 7,104,065 B2 * | 9/2006 | Benz | F23R 3/002 60/725 |
| 7,413,053 B2 | 8/2008 | Wasif et al. | |
| 7,448,215 B2 | 11/2008 | Macquisten et al. | |
| 7,461,719 B2 * | 12/2008 | Tobik | F01N 1/02 181/210 |
| 8,789,372 B2 * | 7/2014 | Johnson | F23R 3/28 60/725 |
| 8,904,794 B2 * | 12/2014 | Matsuyama | F01D 9/023 181/213 |
| 8,991,185 B2 * | 3/2015 | Huber | F23M 99/005 431/114 |
| 2004/0060295 A1 * | 4/2004 | Mandai | F23R 3/005 60/725 |
| 2005/0034918 A1 * | 2/2005 | Bland | F23M 20/005 181/250 |
| 2005/0223707 A1 * | 10/2005 | Ikeda | F23R 3/04 60/725 |
| 2006/0053798 A1 * | 3/2006 | Hadder | F23R 3/007 60/772 |
| 2006/0207259 A1 * | 9/2006 | Holt | F23M 5/085 60/772 |
| 2007/0169992 A1 * | 7/2007 | Wasif | F23M 20/005 181/293 |
| 2007/0283700 A1 * | 12/2007 | Gerendas | F23R 3/002 60/754 |
| 2009/0094985 A1 * | 4/2009 | Johnson | F23R 3/002 60/752 |

(Continued)

*Primary Examiner* — William H Rodriguez
*Assistant Examiner* — Eric Linderman

(57) ABSTRACT

A cover (54, 54A-B) enclosing with clearance (65) an acoustic damping resonator (24) on a working gas path liner (22) of a gas turbine component (28). The cover includes a coolant inlet chamber (56, 56B) with a top wall (58, 58B) that is closer to the liner than a top wall (32) of the resonator, and extends upstream from the resonator relative to the working gas flow (48). Compressed air (26) surrounds the cover at a higher pressure than the working gas and flows (44) into and through the coolant inlet chamber, then through holes (34) in the resonator, then exits through holes (38) the liner into the working gas. The coolant inlet chamber directs the flow of compressed air over a weld (50) of the upstream wall (40) of the resonator to cool it. The cover may be formed as a box (57) or a sleeve (69).

20 Claims, 5 Drawing Sheets

(56) References Cited

U.S. PATENT DOCUMENTS

| | | | | |
|---|---|---|---|---|
| 2010/0186411 A1* | 7/2010 | Matsuyama | F01D 9/023 | 60/725 |
| 2010/0236245 A1* | 9/2010 | Johnson | F23R 3/002 | 60/725 |
| 2011/0138812 A1* | 6/2011 | Johnson | F23R 3/00 | 60/725 |
| 2011/0220433 A1* | 9/2011 | Nakamura | F01D 9/023 | 181/213 |
| 2012/0006028 A1* | 1/2012 | Lee | F01D 9/023 | 60/725 |
| 2012/0137690 A1* | 6/2012 | Sardeshmukh | F23R 3/002 | 60/725 |
| 2012/0198854 A1* | 8/2012 | Schilp | F23R 3/002 | 60/755 |
| 2013/0008167 A1 | 1/2013 | Akamatsu et al. | | |
| 2013/0074501 A1* | 3/2013 | Tiwary | F23M 5/00 | 60/725 |
| 2014/0345282 A1* | 11/2014 | Pfadler | F23R 3/002 | 60/725 |
| 2015/0082794 A1* | 3/2015 | Schilp | F01D 9/023 | 60/722 |
| 2016/0003162 A1* | 1/2016 | Beck | F23R 3/002 | 60/725 |

\* cited by examiner

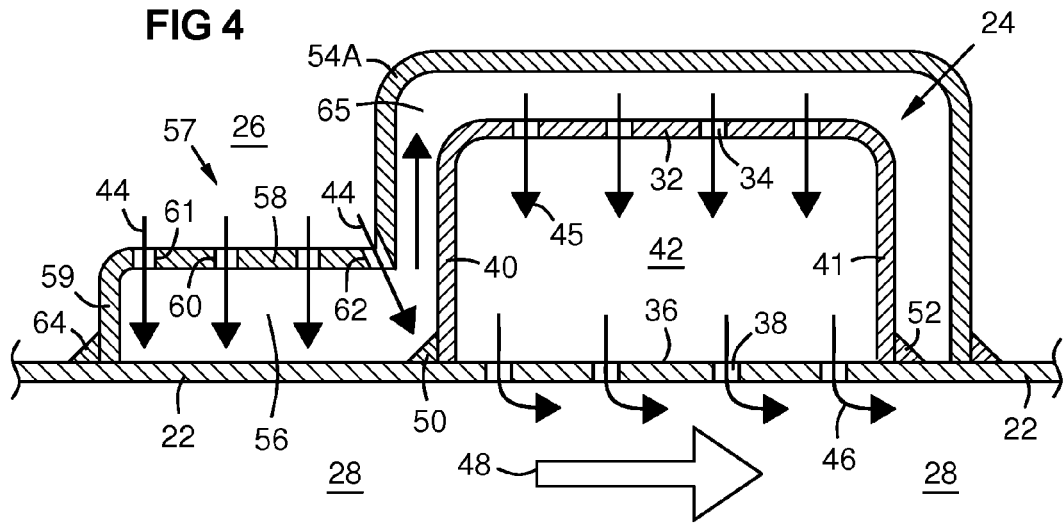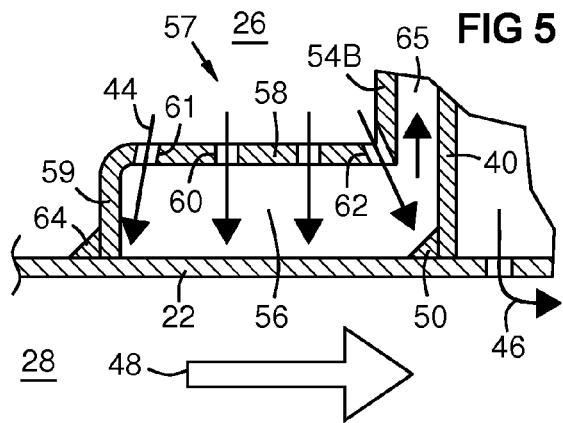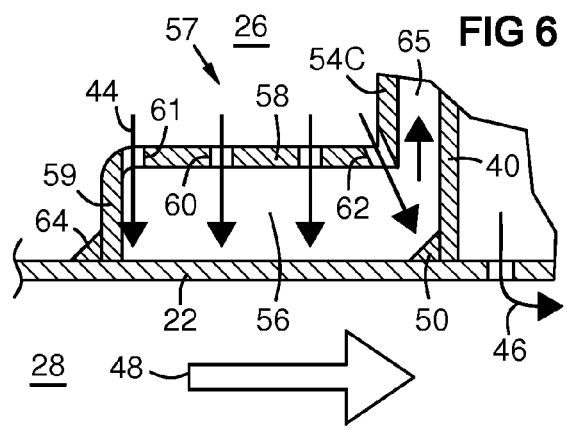

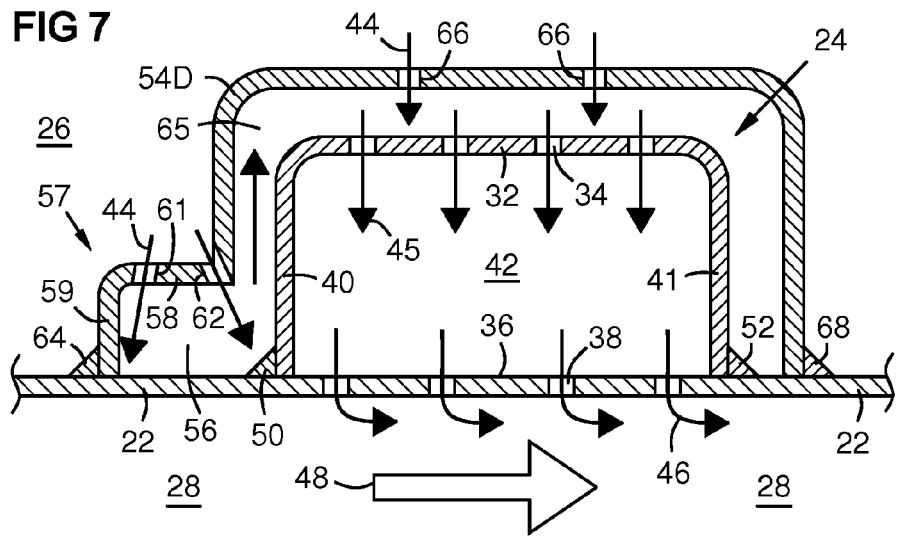
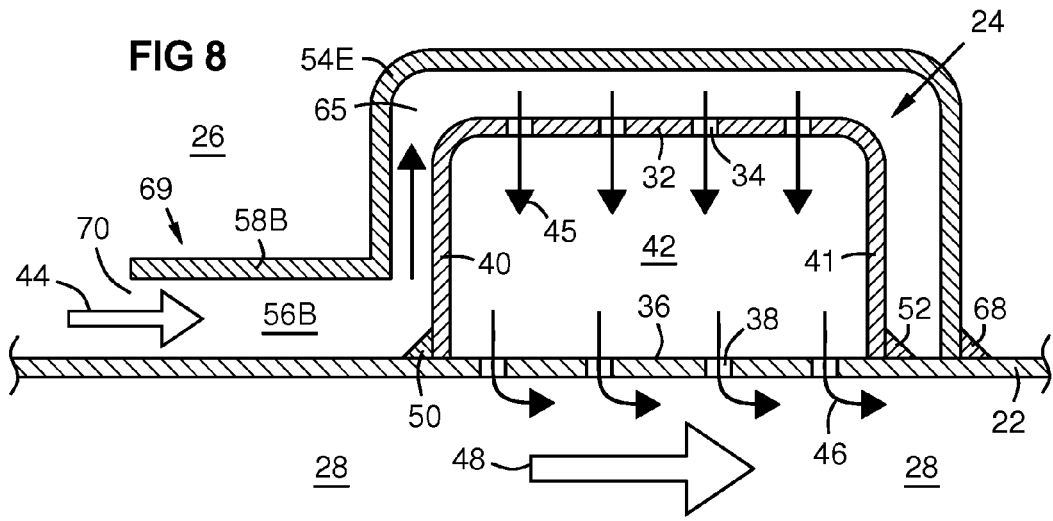
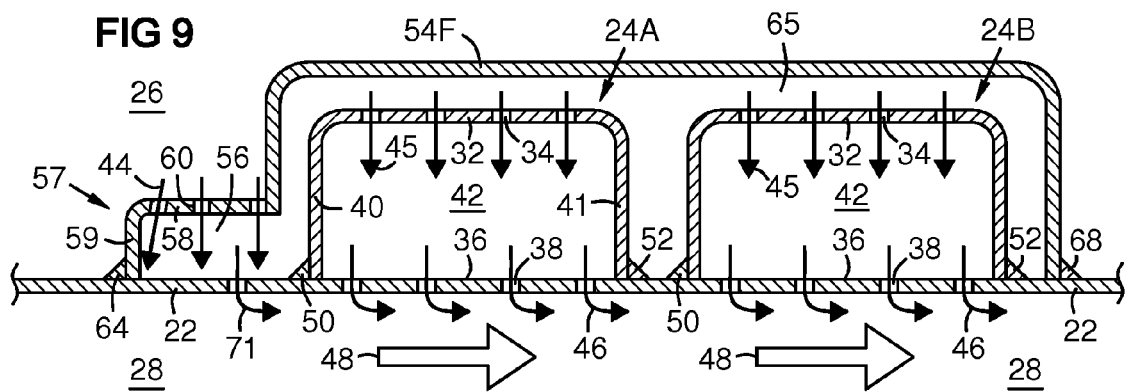

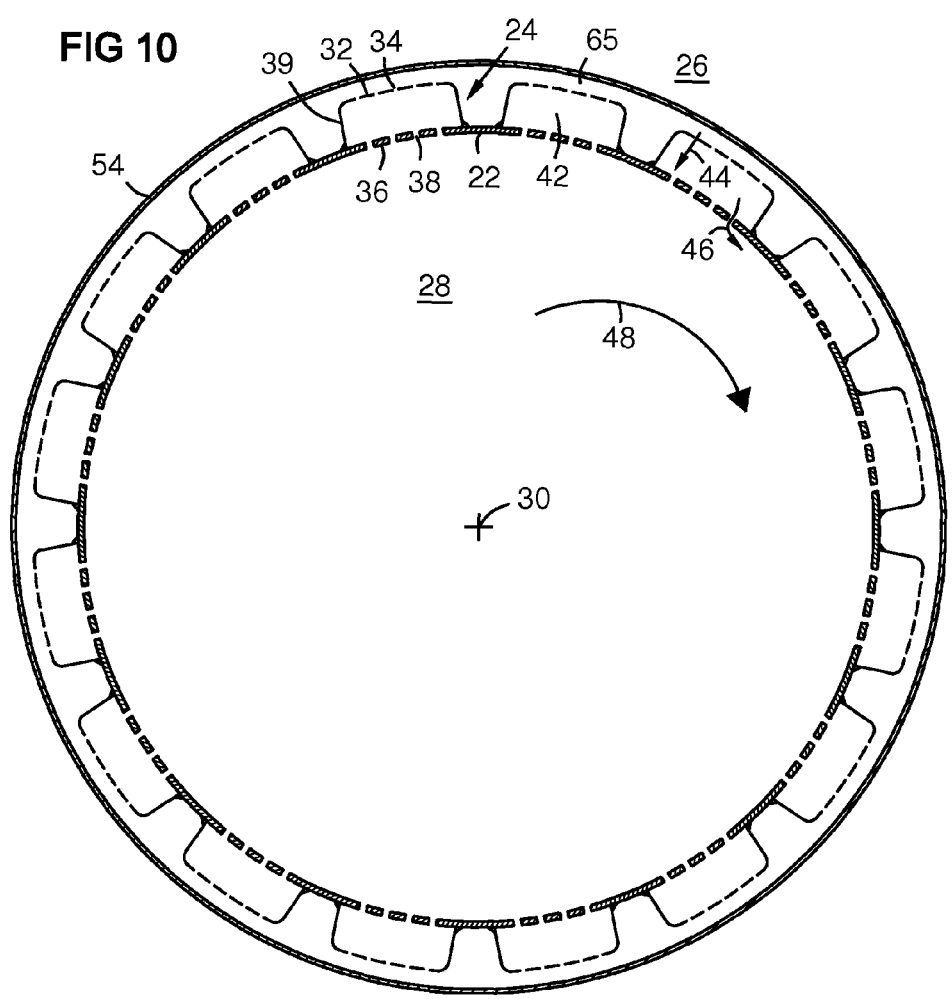

COOLING CHAMBER FOR UPSTREAM WELD OF DAMPING RESONATOR ON TURBINE COMPONENT

FIELD OF THE INVENTION

The invention relates to damping resonators for gas turbine components such as combustor liners and transition ducts, and particularly to a cover for operational cooling of the attachment welds of such resonators.

BACKGROUND OF THE INVENTION

Acoustic damping resonators have been used in gas turbine engines to damp undesired acoustic frequencies in the combustion gas during operation of the engines. They may be called Helmholtz resonators or High Frequency Dynamics (HFD) damping resonators. Examples are disclosed in U.S. Pat. No. 6,530,221. Such a resonator includes a cavity enclosed by walls that may be welded to a component such as a combustor liner. The walls may have holes for cooling air to purge the cavity. This prevents contamination of the cavity via the working gas, and cools the resonator walls and combustor liner. The cooling air passes through the resonator walls, impinges on the combustor liner, and then passes through holes in the combustor liner into the combustion chamber, further cooling the liner. The holes in the combustor liner thus function not only to pass acoustic energy but also to purge the resonator cavity and to cool the liner.

The height of a resonator is the main driver for the damped frequency. In taller resonators, impingement cooling is less effective because the cooling air has more opportunity to disperse before impinging on the hot surface. Resonators are optimally located at areas of highest heat release which exposes the combustor liner underneath the resonator to high temperatures, and also exposes their attachment welds to high temperatures via heat conduction through the liner. Thus, there is a need for impingement cooling under the resonator, but such cooling is diminished with large resonator heights. Furthermore, the upstream weld relative to the combustion gas flow does not benefit from film cooling effect downstream from the holes in the liner.

BRIEF DESCRIPTION OF THE DRAWINGS

The invention is explained in the following description in view of the drawings that show:

FIG. 4 is a side sectional view of a resonator with a cover in a cooling arrangement illustrating aspects of an embodiment of the invention.

FIG. 5 is a side sectional view showing aspects of a second embodiment.

FIG. 6 is a side sectional view showing aspects of a third embodiment.

FIG. 7 is a side sectional view showing aspects of a fourth embodiment.

FIG. 8 is a side sectional view showing aspects of a fifth embodiment.

FIG. 9 is a side sectional view of two resonators under one cover in a sixth embodiment.

FIG. 10 is a transverse sectional view of a gas turbine combustor assembly as viewed in FIG. 2 but with a resonator cover over the circular array of resonators.

DETAILED DESCRIPTION OF THE INVENTION

Figure 1:
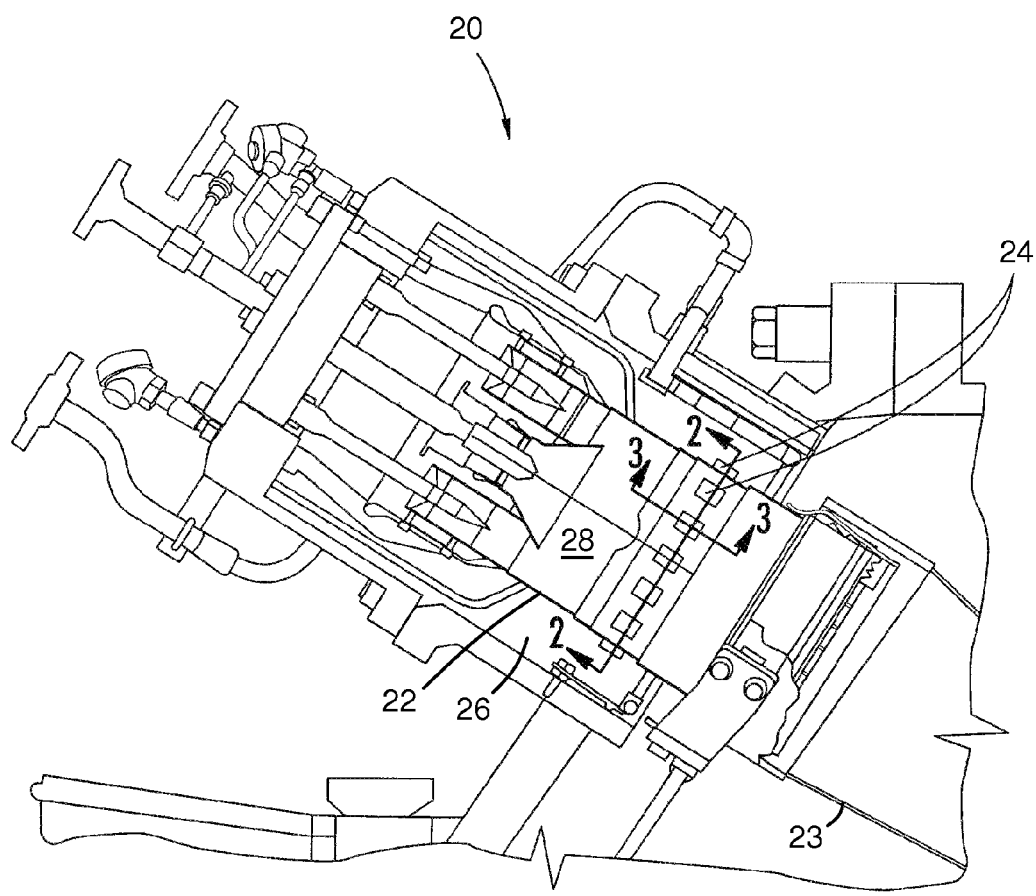
FIG. 1 is a schematic view of a prior gas turbine combustor assembly.

FIG. 1 shows a prior art combustor assembly 20, with a combustor liner 22 surrounding a combustion chamber 28, a circular array of damping resonators 24 on the liner, and a compressed air plenum 26. Another location for such resonators is on the transition duct 23 between the combustor assembly 20 and the turbine, or on other engine components lining the working gas flow path.

Figure 2:
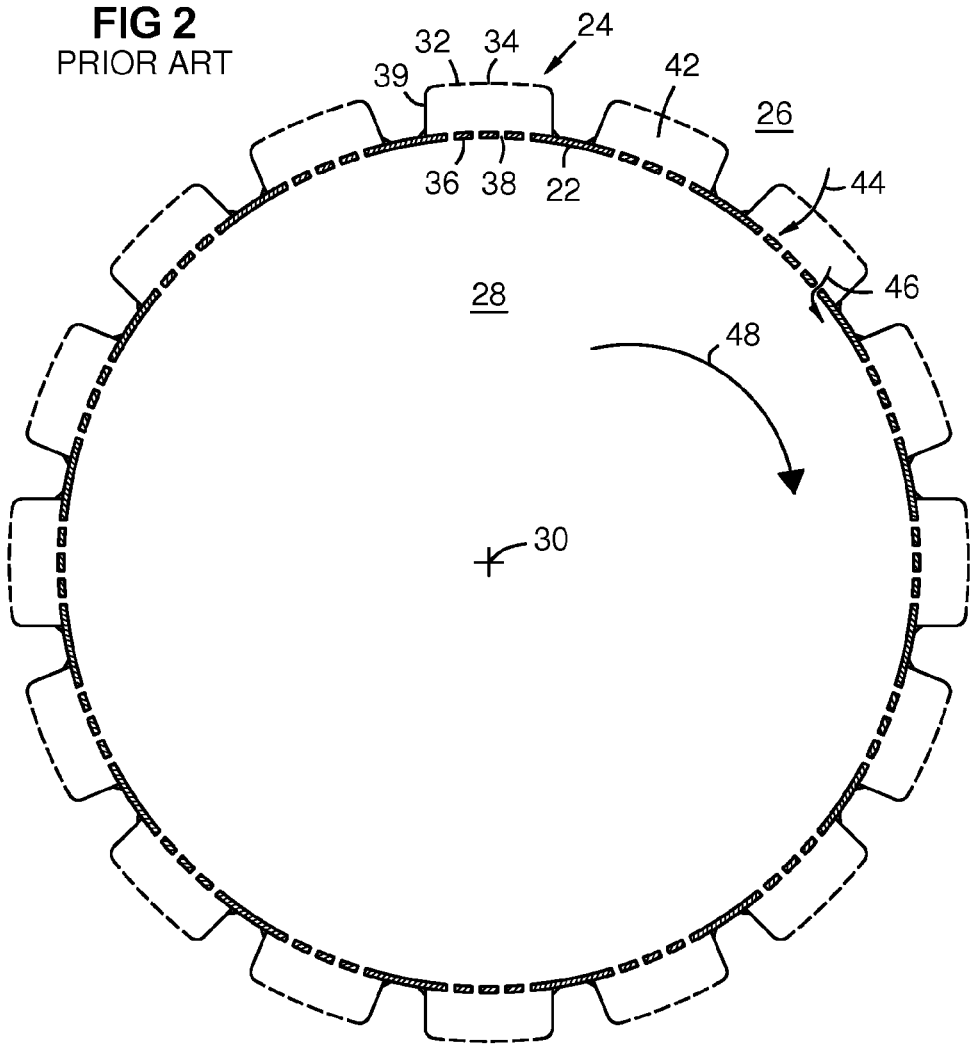
FIG. 2 is a sectional view taken along line 2-2 of FIG. 1.

FIG. 2 is a transverse sectional view of the combustor liner 22 of FIG. 1 taken on line 2-2 of FIG. 1 through the resonators 24. The liner 22 surrounds a combustion chamber 28, which may be generally cylindrical about an axis 30. Each resonator 24 has a top wall 32 with coolant inlet holes 34, a bottom wall 36 with holes 38 for coolant exit from the resonating cavity 42, and side walls 39 between the top and bottom walls. The bottom wall 36 is formed by the compressor liner 22 bounding the working gas flow 48, which flows generally axially, although it is shown here in a swirl for clarity. The coolant exit holes 38 may serve three functions: 1) to facilitate resonant vibrations in the cavity 42; 2) as coolant exits; and 3) for effusion/film cooling of the liner 22. The air plenum 26 receives compressed air from the turbine compressor (not shown). Some of this air 44 enters the coolant inlet holes 34 in the top wall 32 of each resonator, and then escapes 46 into the combustion chamber 28, providing effusion/film cooling of the inner surface of the liner 22.

Figure 3:
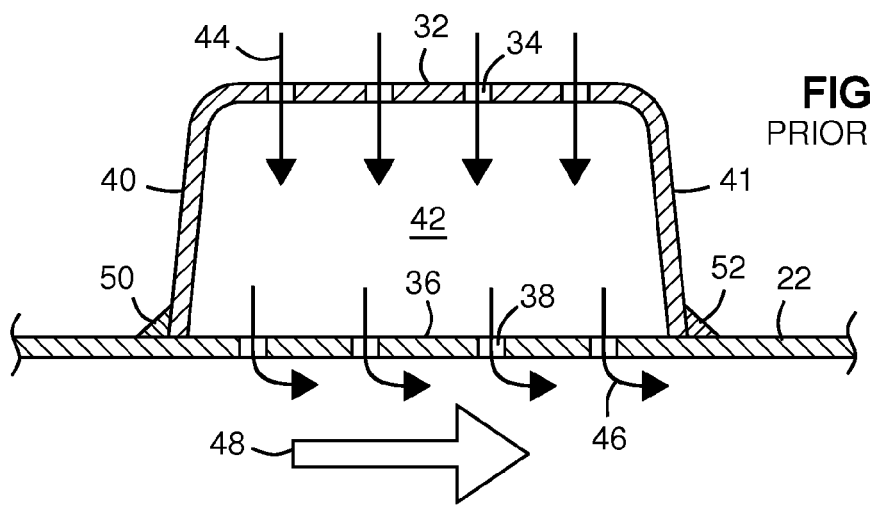
FIG. 3 is a side sectional view of a prior resonator taken along line 3-3 of FIG. 1.

FIG. 3 is a side sectional view of a resonator 24 taken along line 3-3 of FIG. 1. Acoustic vibrations occur in each cavity 42 when there are pressure fluctuations in the working gas 48 flowing past the holes 38 in the liner 22. These vibrations are excited by fluid dynamics mechanisms such as Helmholtz resonance and/or von Karman oscillations. The resonator is tuned by its geometry, size, and position such that it cancels unwanted frequencies in the combustor or other component to which it is attached. Methods and formulas for designing and tuning damping resonators are known and are not detailed here. The downstream weld 52 on the downstream or aft wall 41 is cooled by film cooling 46; however, the upstream weld 50 on the upstream or front wall 40 of the resonator is not so cooled and may thus be subject to higher thermal stresses.

FIG. 4 is a sectional view of a resonator 24 with a cover 54A according to aspects of the invention. The cover includes an impingement box 57 extending upstream from the cover and upstream from the resonator 24 relative to the working gas flow 48, forming a coolant inlet chamber 56. The top wall 58 of the impingement box has impingement cooling inlet holes 60-62. The top wall 32 of the resonator 24 defines a height of the resonator. The top wall 58 of the impingement box 57 may be closer to the combustor liner 22 than is the top wall 32 of the resonator, and the distance may be selected to optimize the impingement cooling effect without adversely affecting resonator performance. It may be close enough to provide direct impingement of the cooling air 44 against the liner 22. Herein, "direct impingement" means some of the cooling air 44 strikes the liner 22 and/or weld 50. Impingement cooling in the coolant inlet chamber 56 is more effective in this respect than cooling air 45 entering the resonator cavity 42. A forward subset 61 of the impingement cooling holes may be close enough to the upstream wall 59 of the impingement box to cool the upstream weld 64 thereof by cooling the wall 59 with impingement and/or film cooling, and by impingement/convective cooling of the liner 22 near the wall

59. The upstream weld 64 may be further thermally protected by being positioned upstream of the maximum heat region of the liner 22, which is typically directly under the resonator 24. An aft subset 62 of the impingement cooling holes may be angled to direct cooling air 44 against the upstream weld 50 of the resonator 24 or close to it. The cover 54A encloses the resonator cavity walls 32, 40, 41 with enough clearance 65 to facilitate coolant flow from the coolant inlet chamber 56 to the top holes 34 in the resonator. During operation, the air in this clearance 65 has reduced pressure compared to air pressure in the plenum 26 as later described.

FIG. 5 shows a cover embodiment 54B with a forward impingement cooling hole 61 angled toward the forward wall 59 of the impingement box 57, thus providing impingement/film cooling thereof near the weld 64. FIG. 6 shows a cover embodiment 54C with a forward impingement cooling hole 61 aligned with the inner surface of the forward wall 59 of the impingement box 57, thus providing film cooling thereof then impinging on the liner 22 adjacent the forward wall 59.

FIG. 7 shows a resonator cover embodiment 54D with only forward and aft impingement cooling holes 61, 62. The forward holes 61 cool the front wall 59, while the aft holes 62 cool the upstream weld 50 of the resonator. This embodiment and others may have additional coolant inlet holes 66 elsewhere on the cover 54D to provide cooler air into the clearance 65 between the cover and the resonator than the air exiting from the coolant inlet chamber 56. Coolant capacity may be apportioned between upstream and downstream areas of the liner and welds via the relative areas of the inlet holes in the impingement box and holes elsewhere on the cover. This can improve cooling uniformity over the liner and welds in comparison to a cover without the additional inlet holes 66.

FIG. 8 shows a cover embodiment 54E with a convective cooling sleeve 69 extending upstream from the cover with an open upstream end 70. The top wall 58B of this sleeve is closer to the liner 24 than is the upper wall 32 of the resonator 24. This forms a coolant inlet chamber 56B that accelerates the compressed air 44 along the liner and against the weld 50, cooling the liner and the upstream weld 50 of the resonator by forced convection. The coolant inlet chamber 56B accelerates the flow of coolant near and against the upstream weld 50 of the resonator 24 by means of direct impingement and/or by forced convection.

FIG. 9 shows a cover embodiment 54F that covers two rows of resonators 24A, 24B. Any of the coolant inlet chamber embodiments herein can be provided with such a multi-row resonator cover. An optional film cooling outlet 71 is shown from the coolant inlet chamber 56 through the liner 22 to further cool the upstream liner and the weld 50. FIG. 9 illustrates an embodiment without impingement cooling directly against the weld 50.

FIG. 10 shows a transverse sectional view as in FIG. 2 with a resonator cover 54 representing any of the embodiments herein extending circumferentially over a circular array of resonators 24. Alternately, a resonator cover may be provided for each resonator individually or any subset of resonators.

The resonator covers 54A-F may be airtight except for the coolant inlet holes 60-62, and 66, or the sleeve entrance 70, so that all of the compressed air 44 entering the cover enters 45 the resonator, and then exits 46 through the cooling holes 38 in the liner. The inlet holes or the sleeve entrance area may be designed to meter the air flow 44 from the air plenum 26. Reduced pressure in clearance 65 between the resonator cover and the resonator conserves coolant air and increases engine efficiency while optimizing cooling. With reduced pressure, the inlet and outlet holes 34, 38 in the resonator may be enlarged without wasting compressed air. This can improve impingement cooling of the liner 22 within the resonator cavity 42 due to the ratio of impingement distance to hole 34 diameter, thus improving liner cooling. Enlarging the liner holes 38 may improve acoustic performance. The resonator covers herein may be used with existing resonator designs with or without resonator modification in some cases, either in original manufacture or by retrofit.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A damping resonator cooling apparatus comprising:
   an acoustic damping resonator comprising a resonating cavity enclosed by resonator walls welded to a liner bounding a flow path of a turbine working gas;
   a cover enclosing the resonator and providing an airflow clearance between the cover and the resonator; and
   a portion of the cover forming a coolant inlet chamber that is upstream of a resonator upstream wall of the resonator walls relative to a flow direction of the turbine working gas in the flow path;
   wherein when a compressed air surrounds the cover at a higher pressure than a pressure of the working gas, the compressed air passes into the coolant inlet chamber through an inlet of the coolant inlet chamber and flows past an upstream weld of said resonator upstream wall to the liner.

2. The cooling apparatus of claim 1 wherein the coolant inlet chamber is formed by an impingement box comprising a coolant inlet chamber top wall with an impingement hole angled to direct a flow of the compressed air against said upstream weld of said resonator upstream wall.

3. The cooling apparatus of claim 1 wherein the resonator comprises:
   a resonator top wall of said resonator walls that is separated from the liner by a first height;
   resonator air inlet holes in said resonator to wall;
   resonator air outlet holes through the liner from the resonating cavity; and
   wherein the coolant inlet chamber is formed by an impingement box comprising an impingement box top wall separated from the liner by a second height that is less than the first height; and
   impingement inlet holes in said impingement box top wall.

4. The cooling apparatus of claim 3 wherein at least some of said impingement inlet holes in said impingement box top wall provide direct impingement of the compressed air against the liner within the coolant inlet chamber.

5. The cooling apparatus of claim 3 wherein at least an aft subset of said impingement inlet holes in said impingement box top wall provide direct impingement of the compressed air against said upstream weld of said resonator upstream wall.

6. The cooling apparatus of claim 3 wherein a forward subset of said impingement inlet holes in said impingement box top wall provide direct impingement of the compressed air against an impingement box upstream wall of the impingement box.

7. The cooling apparatus of claim 3 wherein a forward subset of said impingement inlet holes in said impingement box top wall are aligned with an inner surface of an impingement box upstream wall of the impingement box, and provide film cooling along said impingement box upstream wall.

8. The cooling apparatus of claim 3 wherein a forward subset of said impingement inlet holes in said impingement box top wall directs the compressed air against or along an inner surface of an impingement box upstream wall of the impingement box, and an aft subset of said impingement inlet holes in said impingement box top wall provide direct impingement of the compressed air against said upstream weld of said resonator upstream wall.

9. The cooling apparatus of claim 3 wherein said air that flows past said upstream weld of said resonator upstream wall continues into said airflow clearance between the cover and the resonator, and the cover further comprises inlet holes not on the impingement box that admit additional compressed air into said airflow clearance between the cover and the resonator.

10. The cooling apparatus of claim 1 wherein the coolant inlet chamber is formed between a convective cooling sleeve and the liner, wherein the cooling sleeve comprises an open upstream end and a cooling sleeve top wall that is closer to the liner than a resonator top wall of the resonator walls.

11. The cooling apparatus of claim 1 wherein the compressed air surrounds the cover at a higher pressure than air within said airflow clearance between the cover and the resonator.

12. A damping resonator cooling apparatus for a gas turbine component comprising:
a liner of the component bounding a flow path of a working gas of the gas turbine;
a damping resonator comprising a resonating cavity enclosed by walls welded to the liner of the component;
a resonator top wall of the resonator walls separated from the liner by a first height;
air inlet holes in the resonator top wall;
air outlet holes through the liner from the resonator;
a cover enclosing the resonator with an airflow clearance between the cover and the resonator; and
a portion of the cover extending upstream of a resonator upstream wall of the resonator walls relative to a flow direction of the working gas within the liner, said portion of the cover forming a coolant inlet chamber comprising a coolant inlet chamber top wall spaced from the liner by less than the first height;
wherein when a compressed air surrounds the cover at a higher pressure than a pressure of the working gas within the liner, the coolant inlet chamber accelerates a flow of the compressed air over a weld of the resonator upstream wall to the liner.

13. The cooling apparatus of claim 12 wherein the coolant inlet chamber toe wall comprises impingement inlet holes that provide direct impingement of the compressed air onto the liner upstream of the resonator.

14. The cooling apparatus of claim 12 wherein the coolant inlet chamber top wall comprises inlet holes that direct a flow of the compressed air along or against a front wall of the coolant inlet chamber.

15. The cooling apparatus of claim 12 further comprising impingement cooling inlet holes for the compressed air in the coolant inlet chamber top wall, and other compressed air inlet holes in the cover apart from the coolant inlet chamber.

16. The cooling apparatus of claim 12 wherein the coolant inlet chamber top wall comprises a convective cooling sleeve with an open upstream end.

17. The cooling apparatus of claim 12 wherein the compressed air surrounding the cover has a higher pressure than air within the airflow clearance between the cover and the resonator.

18. A damping resonator cooling apparatus comprising:
a liner bounding a flow of a working gas in a gas turbine component;
a vibration damping resonator comprising a resonating cavity enclosed by walls welded onto the liner;
a cover enclosing the vibration damping resonator and providing an airflow clearance between the cover and the resonator;
a coolant inlet chamber connected to and extending upstream from the cover and upstream of a resonator upstream wall of the resonator walls relative to a direction of the flow of the working gas bounded by the liner;
wherein the coolant inlet chamber is welded to the liner, and a top wall of the coolant inlet chamber is closer to the liner than is a top wall of the resonator; and
wherein the coolant inlet chamber is configured to receive a compressed gas surrounding the cover at a higher pressure than the working gas, and to accelerate the compressed gas over an upstream weld of the resonator upstream wall to the liner.

19. The cooling apparatus of claim 18, further comprising impingement inlet holes in the top wall of the coolant inlet chamber configured to provide direct impingent cooling by the compressed gas on the liner.

20. The cooling apparatus of claim 18, wherein the coolant inlet chamber comprises a flow sleeve with an open upstream end, wherein the flow sleeve is configured to provide forced convective cooling by the compressed gas on the liner.

* * * * *